United States Patent [19]
Greenwood

[11] 3,717,140
[45] Feb. 20, 1973

[54] HEART RATE COUNTER WITH DIGITAL STORAGE AND NUMERICAL READOUT

[76] Inventor: Eugene C. Greenwood, 468 Prospect Street, Newport Beach, Calif. 92660

[22] Filed: Nov. 13, 1970

[21] Appl. No.: 89,245

[52] U.S. Cl. ..........................128/2.05 T, 128/2.06 F
[51] Int. Cl. ................................................A61b 5/02
[58] Field of Search ........128/2.05 P, 2.05 R, 2.05 T, 128/2.06 A, 2.06 F, 2.06 R

[56] References Cited

UNITED STATES PATENTS

| | | | |
|---|---|---|---|
| 3,599,628 | 8/1971 | Abbenate et al. | 128/2.06 F |
| 2,536,527 | 1/1951 | Appel | 128/2.05 P |
| 2,756,741 | 7/1956 | Campanella | 128/2.06 F |
| 3,518,983 | 7/1970 | Jorgensen | 128/2.06 A |
| 3,384,075 | 5/1968 | Mitchell | 128/2.06 F |
| 3,552,386 | 1/1971 | Horth | 128/2.06 A |

*Primary Examiner*—William E. Kamm
*Attorney*—Philip M. Hinderstein

[57] ABSTRACT

Apparatus for determining heart rate based upon the occurrence of two consecutive heart beats and for immediately displaying the determined heart rate in beats per minute. A transducer responsive to the occurrence of a heart beat generates an electrical pulse indicative of such occurrence. The heart beat pulses are applied, together with a train of clock pulses, to a counter which counts the number of clock pulses occurring between consecutive heart beats. A fully decoded, static, read-only memory has stored therein the different pulse rates which correspond to the different numbers of clock pulses which may occur between consecutive heart beats. By applying the output of the counter to the memory, the pulse rate which corresponds to the counted number of clock pulses may be selected. Such selected pulse rate is applied to a display device which visually displays the pulse rate in beats per minute.

10 Claims, 6 Drawing Figures

PATENTED FEB 20 1973 3,717,140

INVENTOR.
EUGENE C. GREENWOOD
BY
ATTORNEY

HEART RATE COUNTER WITH DIGITAL STORAGE AND NUMERICAL READOUT

BACKGROUND OF THE INVENTION

1. Field of the Invention

The present invention relates to a heart rate counter with visual readout and, more particularly, to apparatus for determining pulse rate based upon two consecutive heart beats and for immediately displaying the determined pulse rate during the interval between the next two heart beats.

2. Description of the Prior Art

Heart rate is a basic parameter used to evaluate and determine the condition of the human body. It is for this reason that every patient in every hospital has his or her pulse taken at least once and usually twice a day. This task is presently performed by a nurse or other trained personnel who holds her finger against the patient's wrist so as to sense the heart beats. The nurse then watches her watch and counts the number of beats which occur for a full minute. Occasionally, the nurse may count the number of beats which occur during half a minute and multiply the count by two. In any event, this procedure is obviously time consuming. In view of the present shortages of nurses and other trained hospital personnel and skyrocketing hospital costs, this time consuming procedure for making routine measurements can no longer be tolerated.

In addition to the time consuming nature of the above-described method of obtaining pulse rate, the method is also potentially inaccurate if the nurse or other personnel is inattentive. To overcome this inaccuracy and also to provide for automatic monitoring of pulse rate, electronic devices have been developed for determining and displaying pulse rate. Typically, such electronic devices include a pressure transducer which is held or secured adjacent the carotid artery of the neck, the volar aspect of the wrist, or other well known pressure points, to sense the arterial expansion which occurs for every systolic heart beat. The pressure transducer operates to generate an electrical pulse for each heart beat, which pulses are applied to appropriate electronic circuitry for determining and displaying the pulse rate.

While such electronic devices are substantially more accurate than the hand method described above, available electronic devices require a relatively long time period to determine the pulse rate and do not significantly reduce the amount of time expended by a nurse or other hospital personnel in the routine measurements of pulse rate. For example, one such electronic pulse rate measuring device is described in U.S. Pat. No. 2;114,578 to Strauss wherein pulse beat signals are utilized to charge an integrating capacitor over a known period of time. The accumulated charge, which is indicative of the pulse rate, is then indicated on a meter. Similar devices are shown in U.S. Pat. No. 2,801,629 to Edmark and U.S. Pat. No. 2,927,573 to Roepke.

Another type of electronic device is described in U.S. Pat. No. 2,756,741 to Campanella wherein a pulse counter is used to count how many heart beats occur during a given time interval which is determined by a timing pulse generator. The resultant count, divided by the given time interval, is indicative of the patient's average pulse rate over the measurement time interval. This pulse rate is utilized to control a pulse count display matrix.

In addition to the relatively long time period required by such devices to determine the pulse rate of a patient, most of such devices have had to incorporate rather elaborate circuitry to compensate for the non-linear characteristics of the curve of pulse rate versus time between heart beats. Typical of such devices is that described in U.S. Pat. No. 3,445,840 to Carlstead wherein the beforementioned non-linear curve is approximated by linear segments (frequency range groups) bounded by frequencies $f_1, f_2, f_3, \ldots$ etc. A set of frequency sensors operate one of a plurality of gates, the operated gate being indicative of which frequency range group includes the transducer pulse frequency. The operated gate sets a time base which controls the length of time during which pulses from the transducer are gated to a counter. The accumulated count of the counter indicates the transducer output pulse rate. Another approach to the problem of compensating for the non-linear characteristics of the curve of pulse rate versus time between heart beats is described in U.S. Pat. No. 3,217,144 to Hinnah. As can be seen from an inspection of these patents, the systems are complex and therefore expensive.

SUMMARY OF THE INVENTION

In accordance with the present invention, these problems of the prior art are solved by providing apparatus for determining and displaying pulse rate which is operative to determine pulse rate based upon the occurrence of two consecutive heart beats and to immediately display the determined pulse rate in beats per minute. As a result, the time-consuming, inaccurate method by which a nurse counts the number of heart beats for a given time interval is totally eliminated and replaced by a simple, electronic device which is not only rapid in read-out, but inherently more accurate than a human operator. The present pulse rate counter and display may be embodied in a hand-held, portable, battery-operated, solid state instrument which may be held against the neck or wrist of a patient for a few seconds and which will determine and display the heart rate in beats per minute. The present instrument also overcomes the objective feature of many available electronic devices of requiring a relatively long time period to determine the pulse rate since the present device determines pulse rate based upon two consecutive heart beats. In addition, the present instrument completely eliminates the necessity for elaborate circuitry to compensate for the non-linear characteristics of the curve of pulse rate versus time between heart beats.

Briefly, the present instrument for determining and visually displaying pulse rate in beats per minute includes a transducer responsive to the occurrence of a heart beat for generating an electrical pulse indicative of such occurrence. The heart beat pulses are applied, together with a train of clock pulses, to a counter which counts the number of clock pulses occurring between consecutive heart beats. A fully decoded, static, read-only memory has stored therein the different pulse rates which correspond to the different numbers of clock pulses which may occur between consecutive heart beats. By applying the output of the counter to the memory, the pulse rate which corresponds to the counted number of clock pulses may be selected. Such selected pulse rate is applied to a display device which visually displays the pulse rate in beats per minute.

It is therefore an object of the present invention to provide a novel heart rate counter with visual readout.

It is a further object of the present invention to provide apparatus for determining pulse rate based upon two consecutive heart beats and for immediately displaying the determined pulse rate.

It is a still further object of the present invention to provide a portable, battery-operated, solid state instrument for accurately and quickly determining and displaying pulse rate.

It is another object of the present invention to provide a heart rate counter with visual readout which utilizes a read-only memory for storing the different heart rates which correspond to the different time intervals which may occur between consecutive heart beats and for utilizing such memory to provide an indication of heart rate based upon a determined time interval between consecutive heart beats.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
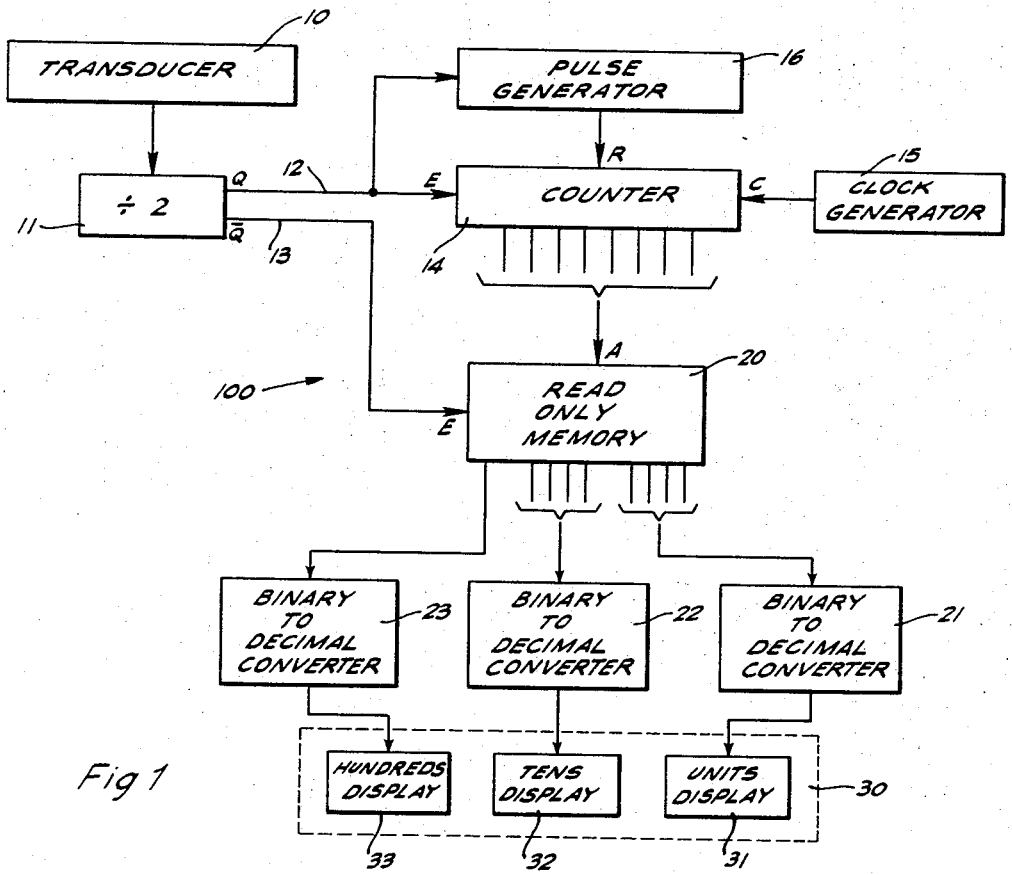
FIG. 1 is a block diagram of a preferred embodiment of heart rate counter with visual readout constructed in accordance with the teachings of the present invention.

Referring now to the drawings and, more particularly, to FIG. 1 thereof, a preferred embodiment of heart rate counter with visual readout, generally designated 100, includes a transducer 10 which is adapted to be held or secured adjacent the carotid artery of the neck, the volar aspect of the wrist, or other well-known pressure points to sense the arterial expansion which occurs for every systolic heart beat. Transducer 10 may be any of the well-known types of pressure transducers or may be a force-motion transducer which senses the movement of the artery. In either event, transducer 10 operates to generate an electrical pulse for each heart beat.

The output of transducer 10 is applied to a divider circuit 11 which divides the output of transducer 10 by a factor of two. According to the preferred embodiment of the present invention, divider circuit 11 is a bistable flip-flop having complementary Q and $\bar{Q}$ outputs which appear on lines 12 and 13, respectively. Upon the occurrence of a first pulse from transducer 10, the Q output of divider 11 goes high and the $\bar{Q}$ output goes low. Upon the occurrence of the next pulse from transducer 10, the Q output goes low and the $\bar{Q}$ output goes high. Upon the occurrence of the next pulse from transducer 10, the cycle repeats. In this manner, divider 11 operates to generate first and second gating signals, each indicating mutually exclusive alternate intervals between consecutive heart beats.

The Q output of divider 11 is applied to the enable input terminal E of a pulse counter 14. Counter 14 also receives, at its clock input terminal C, a clock pulse train from a clock pulse generator 15. The Q output of divider 11 is also applied via a pulse generator 16 to the reset input terminal R of counter 14.

Clock generator 15 may be any one of many known devices for generating a train of clock pulses at a constant, uniform rate. Pulse generator 16 may be any one of many known devices for generating a narrow pulse whenever the signal on line 12 goes high. For example, pulse generator 16 may be a leading edge responsive, monostable multivibrator with a very short time constant.

Counter 14 is a conventional digital counter which, when enabled by an appropriate signal at its E input, counts the pulses appearing at its C input, until a maximum count is reached. For reasons which will appear more fully hereinafter, counter 14 retains the maximum count and is only returned to zero by a pulse at its R input. Accordingly, and in operation, every time the Q output of divider 11 goes high, which occurs for every other pulse from transducer 10, pulse generator 16 resets counter 14 which is simultaneously enabled to start counting the pulses from clock generator 15. Counter 14 continues to count until the next pulse from transducer 10 causes the Q output of divider 11 to go low, thereby removing the enable input to counter 14. At this time, however, pulse generator 16 does not reset counter 14 which holds its count until the occurrence of the next pulse from transducer 10. When this pulse occurs, counter 14 is simultaneously reset and enabled. In addition, and as mentioned previously, if counter 14 reaches its maximum count before being disabled, it retains that count and does not automatically rest itself.

Heart rate counter with visual readout 100 further includes a read-only memory 20 having an address input terminal A, an output enable input terminal E and a plurality of output lines. The count is counter 14 is applied to the A input of read-only memory 20 whereas the $\bar{Q}$ output of divider 11 is applied to the E input of memory 20. According to the preferred embodiment of the present invention, read-only memory 20 is a fully decoded, static, read-only memory of known configuration. More specifically, read-only memory 20 would have a plurality of address locations which would correspond to the count capacity of counter 14. By way of example, if counter 14 is an eight stage counter, capable of counting from 0 to 255, read-only memory 20 would have 256 address locations numbered from 1 to 256. By applying the output of counter 14 to the address input A of read-only memory 20, any one of the address locations in read-only memory 20 may be selected, depending upon the count in counter 14.

At each address location, read-only memory 20 contains a plurality of bits of digital information. In addition, memory 20, being a read-only memory, has the bits at each address location predetermined so that for any address location selected by counter 14, read-only memory 20 will provide a series of known bits of digital information.

As stated previously, the $\bar{Q}$ output of divider 11 is applied to the output enable input E of read-only memory 20 so that read-only memory 20 is only enabled to provide an output when the signal on line 13 is high. This condition exists during alternate intervals between consecutive heart beats, when counter 14 is disabled.

Figure 2:
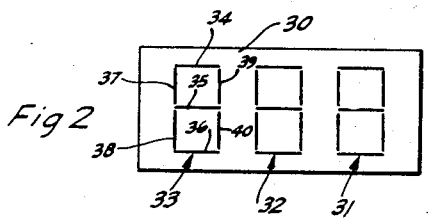
FIGS. 2–6 are schematic views of one type of display device which may be used with the apparatus of FIG. 1.
Figure 3:
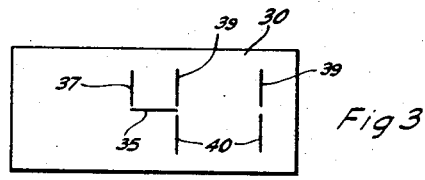
Figure 4:
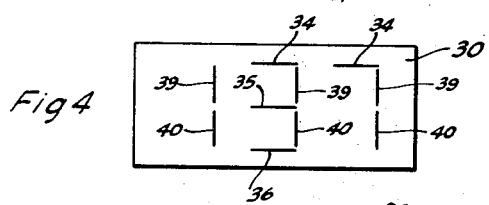

When read-only memory 20 is enabled, its output is conducted to a display device 30. Display device 30 includes a number of display elements 31, 32 and 33 and the number of outputs of read-only memory 20 will be sufficient to drive display device 30. In the present case, each of display elements 31–33 is a decimal display device capable of displaying the numbers 0 through 9. By way of example, a typical such display device is shown in FIG. 2 wherein each display element includes seven bars 34–40, each of which is capable of being selectively energized to produce any of the numbers 0 through 9. For example, FIG. 3 shows how the number "41" may be displayed by energizing bars 39 and 40 of display element 31 and bars 35, 37, 39 and 40 of display element 32 and by deenergizing all remaining bars of display device 30. Also by way of example, FIG. 4 shows how the number "137" may be displayed by energizing bars 34, 39 and 40 of display element 31, bars 34–36, 39 and 40 of display element 32 and bars 39 and 40 of display element 32 and by de-energizing all remaining bars of display device 30. With such display elements, display device 30 will also be able to display the words "HI" and "LO" by energizing the bars shown in FIGS. 5 and 6, respectively. The reason for the provision of the words HI and LO will appear more fully hereinafter.

According to the preferred embodiment of the present invention, display device 30 is capable of displaying any number from 0 through 199 plus the words HI and LO. To achieve this, display element 31 will display the unit digits 0 through 9 which include the "I" and "O" in HI and LO, respectively. Therefore, units display 31 has 10 possible outputs, requiring four parallel bits of digital information for the determination thereof. Accordingly, read-only memory 20 has at least four parallel bits of digital information at each address location, which bits are applied via a binary-to-decimal converter 21 to units display element 31. Binary-to-decimal converter 21 may be any one of many known devices for receiving an input in digital form and converting it to a suitable signal which is capable of driving a binary display.

Display element 32 will display the tens digits 0 through 9 as well as the letters "H" and "L" in HI and LO, respectively. Therefore, tens display 32 has twelve possible outputs, requiring four parallel bits of digital information for the determination thereof. Accordingly, read-only memory 20 has at least an additional four parallel bits of digital information at each address location, which bits are applied via a binary-to-decimal converter 22 to tens display element 32. Binary-to-decimal converter 22 would be similar to binary-to-decimal converter 21, except for its additional ability to recognize a digital input corresponding to the letters H and L.

Display element 33 will display the hundreds digit "1" when display device 30 displays any of the numbers from 100 through 199 and will remain blank when display device 30 displays any of the numbers from 0 through 99 or the words HI or LO. Therefore, hundreds display 33 has only two possible outputs, either nothing or 1, requiring only one bit of digital information for the determination thereof. Accordingly, read-only memory 20 has only one additional bit of digital information at each address location, which bit is applied via a binary-to-decimal converter 23 to hundreds display element 33. Binary-to-decimal converter 23 may be a simple amplifier-gate circuit for receiving the single bit from read-only memory 20 and for energizing or not energizing bars 39 and 40 of display element 33 depending upon whether such single bit is high or low.

In operation, heart rate counter with visual readout 100 may be used to determine the human pulse rate based upon two consecutive heart beats and to subsequently and immediately display the determined pulse rate in beats per minute. For this purpose, clock generator 15 is operative to generate a continuous train of clock pulses which may be counted by counter 14 between consecutive heart beats. More specifically, the output of transducer 10, which consists of an electrical pulse for each heart beat, is applied to divider circuit 11 which generates first and second gating signals indicating mutually exclusive alternate intervals between consecutive heart beats. Accordingly, upon the occurrence of a first pulse from transducer 10, indicating the start of a first interval, the Q output of divider 11 goes high, simultaneously resetting counter 14 via pulse generator 16 and enabling counter 14. It should be noted that at this time, the $\bar{Q}$ output of divider 11 is low, thereby disabling the output of read-only memory 20.

As soon as counter 14 is reset and enabled, it begins to count clock pulses from generator 15. This count continues until the next pulse from transducer 10, indicating the end of the first interval and the start of a second interval, causes the Q output of divider 11 to go low, thereby disabling counter 14. At this time, counter 14 contains a count which is equal to the number of clock pulses occurring between the first two consecutive heart beats.

The purpose of read-only memory 20 is to provide a memory means for storing the different pulse rates which correspond to the different numbers of clock pulses which may occur between consecutive heart beat pulses. More specifically, it is known that the curve of heart rate versus time between heart beats is a hyperbolic function wherein the pulse rate, in pulses per minute, approaches infinity as the time between heart beats approaches zero and wherein the pulse rate approaches zero as the time between heart beats approaches infinity. Accordingly, read-only memory 20 may have stored at each address location a different pulse rate, within a desired display range, and counter 14 may be utilized to select which address location is to be displayed.

The pulse rates stored in memory 20, as well as the number of address locations therein, the frequency of clock generator 15 and the counting capability of counter 14 will all be selected on the basis of the desired operating range of display device 30 and the required accuracy of heart rate counter with visual readout 100. For example, and in accordance with the preferred embodiment of the present invention, counter 100 may be used for all routine heart rate measurements in hospitals, doctors offices, etc. In such an environment, one would expect to encounter heart rates within the range of from approximately 35 beats per minute to approximately 150 beats per minute. If the rate was outside of this range, it would be sufficient to provide an indication of such condition so as to alert the hospital personnel of a critical patient condition. In addition, the area where maximum accuracy would be required would be in the range of 70 beats per minute through 100 beats per minute. In the ranges of 35 through 70 beats per minute and 100 through 150 beats per minute, areas of abnormal heart rates, less accuracy would be required.

Given such requirements, one proposed embodiment would construct counter 14 with eight stages, capable of counting from 0 to 255. Read-only memory 20 would then have 256 address locations, numbered from 1 to 256, each address location containing nine parallel bits of digital information. Read-only memory 20 would also have eight input lines which would receive the eight outputs of counter 14. Read-only memory 20 would contain suitable decoding logic to select one of the 256 address locations based upon the count in counter 14, i.e., the number of the selected address location would be equal to the count in counter 14 plus one.

Also in accordance with the proposed embodiment of the present invention, clock generator 15 would have a frequency of 146 Hz, such frequency being chosen to satisfy the beforementioned requirements. More specifically, the number of clock pulses which will occur between consecutive heart beat pulses for a given clock rate and pulse rate is determined in accordance with the equation:

$$N = 60C/P \qquad (1)$$

where:
 $N$ = number of clock pulses between consecutive heart beats;
 $C$ = clock pulse rate in cycles per second; and
 $P$ = pulse rate in beats per minute.

Accordingly, with a clock pulse rate of 146 Hz and a pulse rate of 35 beats per minute, 250 clock pulses will occur between consecutive heart beats. Therefore, address location 251 in read-only memory 20 will contain the binary number 35 in digital form. When the pulse rate is reduced to 34 beats per minute, the number of clock pulses which will occur between consecutive heart beats increases to 258. However, since read-only memory 20 has only 256 address locations, 35 beats per minute will be the lowest pulse rate stored in read-only memory 20. Address location 256 will contain digital information capable of generating the display shown in FIG. 6, namely the word LO. Therefore, as soon as counter 14 reaches a count of 255, its maximum count, between consecutive heart beat pulses, it will retain that count and energize address location 256 to indicate to the nurse or other personnel that the patient's heart rate is lower than 35 beats per minute.

Figure 5:
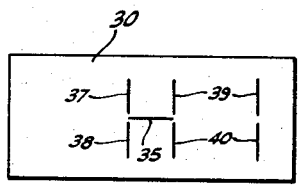
Figure 6:
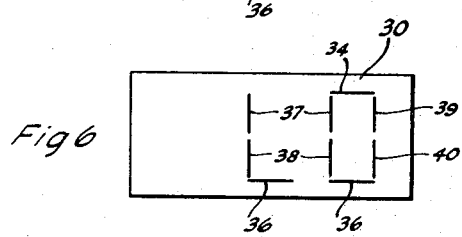

At the other end of the scale, and by way of example, at a pulse rate of 159 beats per minute, 55 clock pulses will occur between consecutive heart beats at a clock pulse rate of 146 Hz. Accordingly, read-only memory 20 would have the digital equivalent of the number 159 stored at address location 56. If this is to be the highest read-out from display 30, all previous address locations, namely address location 1-55, would have the digital equivalent of the word HI, as shown in FIG. 5, stored thereat. Accordingly, if counter 14 counts less than 56 clock pulses from generator 15 between consecutive heart beat pulses, display 30 will indicate the word HI.

At address locations 57 through 249, read-only memory 20 will contain the digital equivalent of the pulse rate which would occur if that number of clock pulses minus one were counted during the time interval between consecutive heart beats. The pulse rate to be stored at each address location may be determined by solving equation (1) for P and inserting each address location minus one for N.

Because of the fact that the curve of heart rate versus time between heart beats is a hyperbolic function, it will be found, when solving equation (1) for P, that several of the address locations at the high end of the memory will have the same pulse rate stored therein and that several of the possible pulse rates at the low address locations will not be stored. For example, at the high address locations, address locations 234–240 will all contain the digital equivalent of the pulse rate 37 whereas address locations 217–222 will all contain the digital equivalent of the pulse rate 40. On the other hand, at the low address locations, address locations 58 will contain the digital equivalent of the pulse rate 154 and address location 59 will contain the digital equivalent of the pulse rate 151. In other words, with the clock rate and counter capacity given, there will be more address locations at the high end than are needed and less than the required number of address locations at the low end. However, with a clock pulse rate of 146 Hz, the cross-over point of the curve of heart rate versus time between consecutive heart beats, where the derivative goes from positive to negative, is at a heart rate of 88 beats per minute so that there will be a high degree of accuracy within the required range of 70 to 100 beats per minute.

As counter 14 counts each clock pulse from generator 15 after the occurrence of the first pulse from transducer 10, read-only memory 20 responds to the count in counter 14 to connect a different address location to its output lines. However, as long as the $\overline{Q}$ output of divider 11 remains low, this output from read-only memory 20 is inhibited. Upon the occurrence of a second pulse from transducer 10, indicating the end of the first interval and the start of the second interval, the Q and $\overline{Q}$ outputs of divider 11 go low and high, respectively. The low Q output disables counter 14 which stops counting. At this time, counter 14 contains a count equal to the number of clock pulses that have occurred between the first and second heart beats and read-only memory 20 has connected to its output lines the address location which contains the pulse rate which corresponds to that number of clock pulses. In addition, the high $\overline{Q}$ output of divider 11 enables the output of read-only memory 20 so that the digital equivalent of the desired pulse rate is applied to binary-to-decimal converters 21 through 23. Binary-to-decimal converters 21–23 operate on their respective digital inputs and apply suitable driving signals to display elements 31–33 of display device 30 so that the pulse rate stored in memory 20 is visually displayed.

Display device 30 continues to display the appropriate pulse rate until the occurrence of a third pulse from transducer 10, indicating the end of the second interval and the start of a third interval. As soon as the third interval begins, the output of read-only memory 20 is disabled, counter 14 is reset to zero and enabled, and the cycle repeats. Accordingly, heart rate counter with visual readout 100 is operative to determine the pulse rate during alternative intervals between consecutive heart beats and to display the determined pulse rate during the remaining alternative intervals between consecutive heart beats.

It can therefore be seen that in accordance with the present invention, there is provided a heart rate counter with visual readout which substantially overcomes the presently existing problems in the prior art. In the first instance, the present invention is operative to completely eliminate the time-consuming, inaccurate method by which a nurse counts the number of heart beats for a given time interval, replacing such method with a simple electronic device which is not only rapid in operation, but inherently more accurate than a human operator. With the present device, the nurse typically will hold the transducer against the neck or wrist of a patient for a few seconds, just enough time for display device 30 to be activated two or three times to insure proper, consistent operation. Since the time between consecutive heart beats is not always exactly the same, the nurse will want to allow for two or three read-outs to get an accurate reading. However, the few seconds required for operation of the present device will be substantially less than the full minute required in most hospitals.

Using available microelectronic circuits, such as off-the-shelf, fully decoded, static, read-only memories, counters, clock generators, flip-flops, binary-to-decimal converters and display elements, the present counter and readout may be embodied in a hand-held, portable, battery-operated instrument which will be simple and easy to use. Furthermore, the present instrument overcomes the objective feature of available instruments of requiring relatively long time periods to determine the pulse rate. Finally, the present instrument completely eliminates the necessity for elaborate and complex circuitry to compensate for the non-linear characteristics of the curve of heart rate versus time between heart beats by the use of a simple, available, read-only memory.

While the invention has been described with respect to a preferred physical embodiment constructed in accordance therewith, it will be apparent to those skilled in the art that various modifications and improvements may be made without departing from the scope and spirit of the invention. For example, it will be apparent to those skilled in the art that read-only memory 20 and counter 14 may be provided with greater capacities than the examples given and that clock generator 15 may operate at a higher frequency to provide greater accuracy, where needed. However, in normal, routine use, a 256 × 9 read-only memory and an eight stage counter is deemed sufficient. It will be also apparent to those skilled in the art that other means may be used for measuring the time interval between consecutive heart beats and for interrogating read-only memory 20 as a function of the measured time interval. It will also be apparent that other types of display devices may be used and that other techniques for driving the disclosed display device 30 may also be used. For example, binary-to-decimal converters 21–23 may be eliminated by providing seven parallel bits of digital information for each of display elements 31–33 and by connecting such seven bits directly to the seven bars 34–40 of display elements 31–33 to energize or not energize the individual bars, depending upon whether the digital information on each output line from memory 20 is high or low. The disadvantage of this approach is that it increases the number of bits of digital information which must be stored at each address location in read-only memory 20. Accordingly, it is to be understood that the invention is not to be limited by the specific illustrative embodiment, but only by the scope of the appended claims.

I claim:

1. Apparatus comprising:
    means for generating an electrical signal indicative of the measured time interval between consecutive heart beats;
    digital, read-only memory means having a plurality of address locations, each of said address locations containing a plurality of predetermined bits of digital information, said address locations being operative to store the different pulse rates which correspond to the different time intervals which may occur between consecutive heart beats, said electrical signal being applied to said memory means to select the address location having stored therein the bits of digital information indicative of the pulse rate corresponding to said measured time interval; and
    display means responsive to said bits of digital information at said selected address location for visually displaying said selected pulse rate.

2. Apparatus according to claim 1 wherein said memory means has stored therein pulse rates lying within a given range and signals indicating pulse rates outside of said given range, said signals being applied to said display means when said time interval indicates a pulse rate outside of said given range.

3. Apparatus according to claim 2 wherein said display means comprises means for visually displaying a decimal number equal to said selected pulse rate when said pulse rate lies within said given range and a characteristic indication when said pulse rate lies outside of said given range.

4. Apparatus according to claim 3 wherein said characteristic indication indicates whether said pulse rate is higher or lower than said given range.

5. Apparatus according to claim 1 wherein said display means comprises means for visually displaying a decimal number equal to said selected pulse rate.

6. Apparatus according to claim 1 further comprising:
    means for dividing consecutive time intervals between heart beats into two sets of mutually exclusive alternate time intervals, said generating means being operative during one set of said alternate time intervals, and said display means being operative during the other set of said alternate time intervals.

7. Apparatus according to claim 1 wherein said generating means comprises:
   a source of clock pulses; and
   counting means for counting the number of clock pulses occurring between consecutive heart beats.

8. Apparatus according to claim 7 wherein said address locations store the different pulse rates which correspond to the different numbers of clock pulses which may occur between consecutive heart beats, the count in said counting means being applied to said memory means to select the address location having stored therein the bits of digital information indicative of the pulse rate corresponding to the number of counted clock pulses.

9. Apparatus according to claim 8 wherein said generating means further comprises:
   means responsive to the occurrence of a heart beat for generating a pulse indicative thereof.

10. Apparatus according to claim 9 further comprising:
   means responsive to said heart beat pulses from said generating means for dividing the time intervals between consecutive heart beats into first and second gating signals, each indicating mutually exclusive alternating time intervals, said first gating signal being applied to said counting means for enabling said counting means during alternate time intervals, said second gating signal being applied to enable said display means during the remaining alternate time intervals.

* * * * *

REEXAMINATION CERTIFICATE (962nd)
United States Patent [19]
Greenwood

[11] B1 3,717,140
[45] Certificate Issued  Dec. 13, 1988

[54] HEART RATE COUNTER WITH DIGITAL STORAGE AND NUMERICAL READOUT

[76] Inventor: Eugene C. Greenwood, 468 Prospect St., Newport Beach, Calif. 92660

Reexamination Request:
No. 90/001,216, Apr. 10, 1987

Reexamination Certificate for:
Patent No.: 3,717,140
Issued: Feb. 20, 1973
Appl. No.: 89,245
Filed: Nov. 13, 1970

[51] Int. Cl.$^4$ ............................................. A61B 5/02
[52] U.S. Cl. ...................................................... 128/689
[58] Field of Search ................. 128/687, 689, 702-706

[56] References Cited

U.S. PATENT DOCUMENTS

| | | | |
|---|---|---|---|
| 3,156,235 | 11/1964 | Jaeger | 128/689 |
| 3,263,064 | 7/1966 | Lindars | 235/92 |
| 3,328,767 | 6/1967 | Ottaway | 340/172.5 |
| 3,422,422 | 1/1969 | Frank et al. | 340/347 |
| 3,518,983 | 7/1970 | Jorgenson | 128/702 |
| 3,537,003 | 10/1970 | Planta et al. | 324/79 |
| 3,599,628 | 8/1971 | Abbenante et al. | 128/687 |

OTHER PUBLICATIONS

Electronic Design 5 Magazine, Mar. 1, 1967 issue, article entitled "Generate Time Functions Digitally", by Roy A. Griffis and Charles W. Skinn, pp. 59–61.
Electronics magazine, May 11, 1970 issue, article entitled "Making Small ROM's do Math Quickly, Cheaply and Easily", by Albert Hemel, pp. 104–111.
Electronics magazine, Apr. 14, 1969 issue, feature entitled "Two Firms Enter MOS Read-Only Memory Race", p. 189.
Electronics magazine, Jan. 5, 1970 issue, article entitled "Standard Read-Only Memories Simplify Complex Logic Design", by Floyd Kvamme, pp. 89–95.
The Electronic Engineer magazine, Jul. 1970 issue, article entitled "MOS Course-Part 5B, Read-Only Memories", by Arthur J. Boyle, pp. 63–69.

*Primary Examiner*—William E. Kamm

[57] ABSTRACT

Apparatus for determining heart rate based upon the occurrence of two consecutive heart beats and for immediately displaying the determined heart rate in beats per minute. A transducer responsive to the occurrence of a heart beat generates an electrical pulse indicative of such occurrence. The heart beat pulses are applied, together with a train of clock pulses, to a counter which counts the number of clock pulses occurring between consecutive heart beats. A fully decoded, static, read-only memory has stored therein the different pulse rates which correspond to the different numbers of clock pulses which may occur between consecutive heart beats. By applying the output of the counter to the memory, the pulse rate which corresponds to the counted number of clock pulses may be selected. Such selected pulse rate is applied to a display device which visually displays the pulse rate in beats per minute.

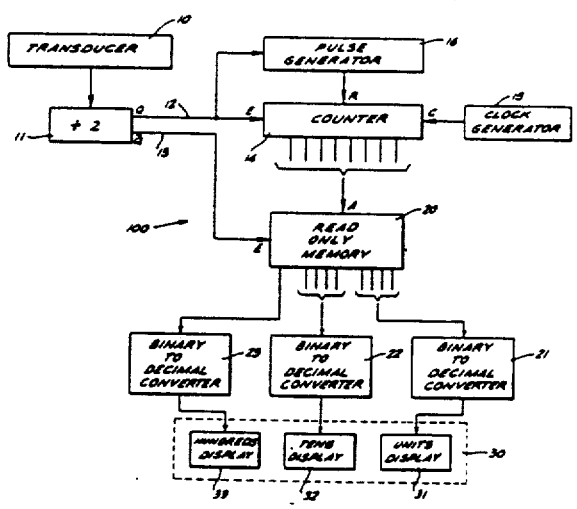

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9 is confirmed.

Claim 10 is determined to be patentable as amended.

New claim 11 is added and determined to be patentable.

10. Apparatus according to claim 9 further comprising:
means responsive to said heart beat pulses from said generating means for dividing the time intervals between consecutive *sets of* heart beats into first and second gating signals, each indicating mutually exclusive alternating time intervals, said first gating signal being applied to said counting means for enabling said counting means during alternate time intervals, said second gating signal being applied to enable said display means during the remaining alternate time intervals.

*11. An apparatus for measuring and displaying the pulse of an individual, comprising:*
*trandsucer means for sensing heartbeats,*
*a source of clock pulses,*
*digital read-only memory means having a plurality of address locations, each of said address locations containing a plurality of predetermined bits of digital information, counting means for counting number of clock pulses occurring between heartbeats, said address locations being operative to store different pulses which occur between heartbeats, said count in said counting means being applied to said memory means to select the address location having stored therein the bits of digital information indicative of the pulse rate corresponding to the number of counted clock pulses;*
*display means responsive to said bits of digital information at said selected address location for visually displaying a decimal number equal to said selected pulse rate; and means for giving a characteristic indication when the pulse rate lies outside a given range and where the counting means counts the number of clock pulses between consecutive heartbeats.*

* * * * *